Feb. 5, 1935.  B. L. DORSEY  1,989,850

FISHING JIG

Filed Nov. 2, 1931

INVENTOR
BENJAMIN L. DORSEY.
BY A. B. Bowman
ATTORNEY

Patented Feb. 5, 1935

1,989,850

UNITED STATES PATENT OFFICE 1,989,850

FISHING JIG

Benjamin L. Dorsey, Los Angeles, Calif.

Application November 2, 1931, Serial No. 572,455

3 Claims. (Cl. 43—47)

My present invention relates to fishing jigs, particularly adapted for trolling or casting.

The objects of this invention are:

First, to provide a very simple, economical and durable fishing jig of this class;

Second, to provide a fishing jig, the longitudinal axis of which is always substantially in alinement with the main portion of the fishing line to which the jig is attached;

Third, to provide a fishing jig in which the sinker, spinner, and hooks are mounted on the same shank or other member within relatively small limits, thus providing a jig in which the desired and necessary features are confined within a stave simulating a small fish or other bait, and further providing a jig which may be readily cast from the end of a fish pole easily and without tangling the fish line;

Fourth, to provide a fishing jig in which the hooks are held in substantial alinement with the longitudinal axis of the jig so that when a fish strikes at the jig from the side and glances off toward the rear end of the jig, the fish will more likely be caught than when the hooks are dangling;

Fifth, to provide a novelly and simply constructed spinner and a simple method of mounting the same on the jig, and also a novel method of mounting the spinner around a sinker;

Sixth, to provide novel sinker means for a jig of this class, and sinker means whereby the weight at the end of the line may be readily increased or decreased to a considerable extent, and also a sinker of this class whereby a streamline shape thereof may be retained even though the sinker is increased or decreased in size;

Seventh, to provide a novel sinker construction which may be readily varied in size and which may be readily shifted and secured in various positions on the shank of the jig for retaining the jig in proper balance; and Eighth, to provide a fishing jig of this class which will not readily deteriorate or get out of order.

Figure 1:
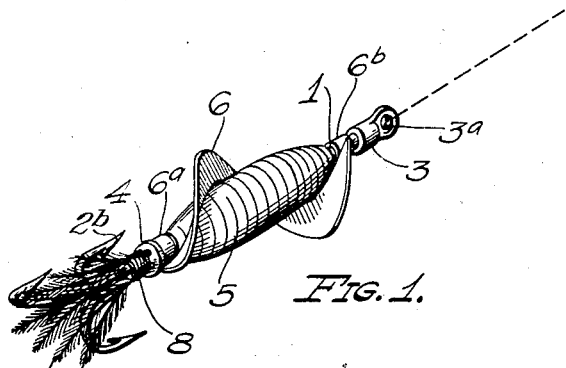
Figure 2:
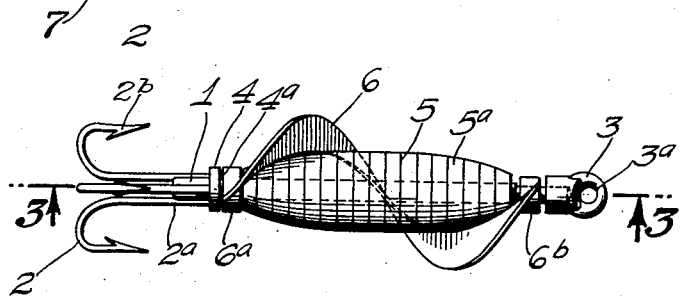
Figure 3:
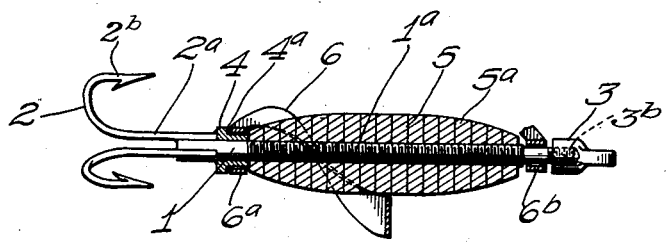

With these and other objects in view as will appear hereinafter, I have devised a fishing jig having certain novel features of construction, combination and arrangement of parts and portions as will be hereinafter described in detail and particularly set forth in the appended claims, reference being had to the accompanying drawing and to the characters of reference thereon which form a part of this application, in which:

Figure 1 is a perspective view of my fishing jig in this preferred form of construction; Fig. 2 is a side view thereof showing the hook concealing means removed to facilitate the illustration; and Fig. 3 is a partial longitudinal sectional view thereof taken through 3—3 of Fig. 2.

Similar characters of reference refer to similar parts and portions throughout the several views of the drawing.

My fishing jig, as illustrated in the drawing, consists of a shank member 1, hooks 2, an eye member 3, a bearing member 4, a sinker 5, a spinner 6, and hook concealing means 7.

The shank or shank member 1 consists of a rigid rod. The hooks 2, which are of conventional construction, are secured with their shanks 2a to one end of the shank member, longitudinally with respect thereto but equally spaced there around with the hook portions 2b of the hooks radiating outwardly with respect to the axis of the shank member 1. The hooks may be welded, brazed or otherwise secured to the shank member 1. The eye member 3 is provided with an eye 3a to which a fish line may be secured, and is also provided with a threaded recess 3b for receiving the threaded end of the shank member 1, opposite the end thereof to which the hooks are secured.

Intermediate the ends of the shank member, coaxial therewith, and adjacent the ends of the shanks of the hooks is rigidly mounted a bearing member or collar 4. The portion of the shank member between the collar and the eye member 3 is threaded as indicated by 1a, the threaded portion extending to within a short distance of the eye member. On the threaded portion 1a of the shank member is mounted the sinker 5. This sinker consists of a multiplicity of flat circular discs 5a which are preferably made of a heavy metal such as lead, brass, or the like. These discs are preferably internally threaded at their central portions so as to be capable of being screwed upon the threaded shank and, when so mounted on the threaded shank in engaging relation, to be locked with respect to each other and the shank member 1. When all of the sinker discs are assembled or mounted on the shank member, they form together a stream lined sinker substantially in the form of an elongated ellipsoid. In the latter instance, the discs adjacent the hooks may abut against the adjacent ends of the collar 4. When it is desired to reduce the sinker, some of the discs are removed, and preferably the middle discs, that is the ones of larger diameter are removed. In the latter case the sinker is preferably spaced from the collar 4 so that the proper balance of the jig may be maintained.

The spinner 6 is substantially a helically shaped spinner made of a flat metal plate and twisted so as to circumscribe substantially the whole of the sinker around which it is placed. To the opposite ends of the spinner are rigidly secured collars 6a and 6b, the former being mounted on and around the collar 4 and the latter being rotatably mounted on the shank member 1 between the eye member 3 and the adjacent end of the sinker, the latter portion of the shank member being preferably free of threads. The collar 4 is provided preferably with an annular shoulder 4a against which the collar 6a of the spinner is adapted to bear.

At the hook end of the jig are positioned feathers for concealing the hooks to some extent, the stems of the feathers being positioned adjacent and around the shanks of the hooks to which the feathers are secured by a thread 8 or other securing means.

Though I have shown a particular construction, combination and arrangement of parts and portions of my fishing jig, and have illustrated and described a specific combination and arrangement of parts and portions which form the preferred structure, I do not wish to be limited to this particular construction, combination and arrangement, but desire to include in the scope of my invention, the construction, combination, and arrangement of parts and portions substantially as set forth in the appended claims.

Having thus described my invention, what I claim as new and desire to secure by Letters Patent is:

1. In a fishing jig, a threaded shank having a hook connected at one end thereof, and having means at the opposite end for attaching a fish line thereto, and a sinker comprising a plurality of concentric flat discs mounted in abutting relation to each other on the threaded portion of the shank, the discs being respectively smaller in diameter from the intermediate portion of the sinker towards the opposite ends thereof, said shank continuing through and projecting beyond the ends of said sinker.

2. In a fishing jig, a threaded shank having a hook connected at one end thereof, and having means at the opposite end for attaching a fish line thereto, and a sinker mounted on said shank and terminating short of the ends thereof, said sinker comprising a plurality of concentric flat discs mounted in abutting relation to each other on the threaded portion of the shank, each of the discs being internally threaded at their axial portions for screwing on the threaded shank, the adjacently positioned discs being adapted to be locked with respect to each other on said shank.

3. In a fishing jig, a threaded shank having a hook connected to one end thereof, and having means at the opposite end for attaching a fish line thereto, there being a bearing having a shoulder at the hook end of the shank, a spinner having a pair of axially spaced bearing portions, one mounted on said bearing and adjacent the shoulder on said bearing, and the other bearing portion of the spinner being mounted on the shank adjacent the opposite end thereof, and a sinker mounted on the shank between the spaced bearing portions of the spinner.

BENJAMIN L. DORSEY.